United States Patent [19]
Miyazaki et al.

[11] Patent Number: 5,168,404
[45] Date of Patent: Dec. 1, 1992

[54] OPTICAL ELEMENT AND GLASS BLANK FOR PRODUCING THE OPTICAL ELEMENT

[75] Inventors: Sunao Miyazaki, Kawasaki; Tetsuo Kuwabara, Urawa; Nobukazu Yogo, Yokohama, all of Japan

[73] Assignee: Canon Kabushiki Kaisha, Tokyo, Japan

[21] Appl. No.: 727,071

[22] Filed: Jul. 9, 1991

[30] Foreign Application Priority Data

| | | |
|---|---|---|
| Jul. 17, 1990 [JP] | Japan | 2-187146 |
| Jul. 17, 1990 [JP] | Japan | 2-187148 |
| Jan. 11, 1991 [JP] | Japan | 3-12599 |
| Apr. 19, 1991 [JP] | Japan | 3-113718 |

[51] Int. Cl.5 ............ G02B 3/04; C03B 11/08
[52] U.S. Cl. .................. 359/718; 65/37; 65/39; 359/708
[58] Field of Search ............ 359/642, 708, 718; 65/37, 38, 39

[56] References Cited
U.S. PATENT DOCUMENTS
4,840,463  6/1989  Clark et al. .............. 359/900 X Primary Examiner—Scott J. Sugarman
Attorney, Agent, or Firm—Fitzpatrick, Cella, Harper & Scinto

[57] ABSTRACT

Disclosed is a glass blank used in a producing process for molding an optical element by heating a glass material and press molding the glass material in a mold having optical functional surfaces. Employed is the glass blank having the glass surface coated with a reaction preventive layer and a hydrocarbon layer or with the hydrocarbon layer.

2 Claims, 7 Drawing Sheets

OPTICAL ELEMENT AND GLASS BLANK FOR PRODUCING THE OPTICAL ELEMENT

BACKGROUND OF THE INVENTION

1. Field of the Invention

The present invention is directed generally to a glass blank used as a molding material in press molding of an optical element such as a lens or the like, and more particularly, to a glass blank for obtaining a favorable optical element by preventing cracking in a cooling process as well as by reducing frictional force and adhesion to mold members during a pressing operation.

2. Related Background Art

Preventing fusion between a molding material glass and molding mold members has hitherto been a big problem in terms of obtaining a good molded product in a reheat press of the glass. For this purpose, a variety of techniques for improving the mold members were proposed. In recent years, in order to prevent the fusion the further proposals of improvements of the molding materials have begun to appear. Proposals on the improvements of such molding materials were disclosed in, for example, Japanese Patent Publication Nos. 2-1778, 2-1779, 2-1780 and 61-29890. In these publications it is disclosed that the surface of the glass substrate is coated with a glass layer, a silicon oxide layer or carbon layer each having a higher glass transition point temperature than that of the glass substrate. Disclosed in Japanese Patent Laid-Open Application No. 1-264937 is such an arrangement that a thin layer of an organic substance is coated on the surface of the glass substrate.

The improvements permit to obtain an effect for preventing the fusion to the mold members. There arise, however, the following problems inherent in the methods disclosed in the above-mentioned Patent Publications.

(a) Where the glass layer having a higher glass transition point temperature than that of the glass substrate is coated on the surface of the glass substrate, the glass layer coated thereon is cracked due to a press pressure. The substrate glass oozes out from the crack to cause partial fog on the surface or partial fusion to the mold members. Alternatively, the frictional force between the glass blank and the mold members increases during a cooling process, with the result that the glass may be cracked in some cases.

(b) Where the silicon oxide layer is coated on the surface of the glass substrate, as in the case of (a), the crack is liable to occur during the cooling process because of a good matching property of silicon oxide to the mold members. A thermal expansion coefficient of silicon oxide is remarkably higher than that of a typical optical glass which constitutes the glass substrate. Hence, the silicon oxide layer tends to crack during a heating process.

(c) Where the carbon layer is coated thicker on the surface of the glass substrate than required, the carbon reacts to oxygen in the glass, because carbon is a reducing agent. The glass component is thereby reduced, so that the glass is colored in brown. Especially, when a lead-contained glass is employed as a glass substrate. PbO in the glass is reduced. As a result, coloring becomes conspicuous and its transmissivity deteriorates.

(d) Where the organic substance layer is coated on the surface of the glass substrate, the organic substance layer is decomposed during heating. In some cases a corrosive gas (e.g., a chloric gas and a fluoric gas) is generated to thereby cause a problem in which the press molding device is contaminated, and a durability of the device including the mold members is deteriorated. The decomposition described above partially takes place at random, and hence a surface accuracy may decline.

SUMMARY OF THE INVENTION

It is a primary object of the present invention, in the view of said problems of the prior arts, to prevent a decline of surface accuracy, fogging, coloring and cracking of a molded product as well as fusion between a glass glank and mold member.

It is another object of the present invention to prevent a reaction of the glass blank to the mold member to thereby prevent fogging in the molded product as well as to prevent the fusion between the molded product the mold member, cracking and coloring.

It is still another object of the present invention to obtain a lens (non-spherical lens) having a non-spherical configuration.

According to the present invention, there is proposed a further improvement of the invention based on the first object.

In the proposal with respect to the first object it is found in some cases that easy-to-react components, particularly, an alkalic metal oxide and a hydrocarbon layer existing in the glass react to each other with the result that very minor fog appears in the molded product.

Accordingly, it is a further object of the present invention to prevent the reaction of the glass blank to the mold member to thereby prevent considerably coloring and fogging in the molded product as well as to prevent the fusion between the molded product and the mold member, cracking and coloring.

To accomplish said object, according to one aspect of the invention, there is provided a glass blank for producing an optical element and employed as a molding material upon producing the optical element by press molding wherein a surface layer of a glass substrate of the glass blank has a less content of alkalic component than that in a core portion of the glass substrate, and a hydrocarbon layer is formed on said glass substrate. Also, there is provided an optical element producing method using said glass blank.

To accomplish the above-described objects, according to another aspect of the invention, there is provided a glass blank for producing an optical element and used as a molding material upon producing the optical element by press molding, comprising a hydrocarbon layer coated on a surface on which at least optical functional surface of a glass substrate is formed.

A thickness of the hydrocarbon layer is set to e.g., 10 to 50 Å, whereby a small amount of reactive gas layer is formed on an interface between the mold members and the glass blank to reduce an adhesion of the glass blank to the mold members. The fusion and cracking can be thereby prevented. As compared with the carbon layer, the hydrocarbon layer contains much $CH_2$ in the film with the same thickness. Therefore, the transmissivity of the glass blank is not decreased so much. Besides, the advantages to prevent the fusion and the crucking are sufficient even in the case of an ultrathin layer (having a thickness of 10 to 50 Å).

A usable method for forming the hydrocarbon layer includes such methods by which the hydrocarbon layer can be formed uniformly on the glass blank as high frequency discharge processing of a hydrocarbon gas, ion gun processing or DC discharge processing. Besides, these methods have an advantage in which processing needs low costs.

To accomplish the second object described above, according to a further aspect of the invention, there is provided a glass blank for producing an optical element and employed as a molding material upon producing the optical element by press molding, comprising a reaction preventive layer and a hydrocarbon layer coated in this sequence on a surface on which at least optical functional surface of a glass substrate is formed.

The reaction preventive layer prevents fogging on the glass blank which is caused by reaction of the glass blank to the mold member at a molding temperature. For this reason, the substance having a higher fusing point than that of the glass blank is effective for the reaction preventive layer, therefore, includes, e.g., $Al_2O_3$, $SiO_2$, $MgF_2$, or glass for deposition. A thickness of the reaction preventive layer has its lower limit so that the glass component does not reach the surface of the mold member when the glass component is diffused into the reaction preventive layer at the molding temperature. The reaction preventive layer has it supper limit of thickness so that cracks do not occur during the molding process. The range of the thickness is, e.g., 100 to 500 Å.

The hydrocarbon layer is such that an extremely small amount of reactive gas layer is formed on the interface between the mold member and the glass blank to thereby reduce the adhesion of the glass blank to the mold member and to prevent fusion and cracking. For this purpose, a thickness of the hydrocarbon layer is, for instance, 10 to 50 Å. If the hydrocarbon layer is too thin, sufficient advantage to reduce the adhesion can not be obtained. Whereas if too thick, coloring on the molded product becomes conspicuous, whereby the transmissivity declines. For this reason, if the thickness of the hydrocarbon layer is too thick it is required to remove both the hydrocarbon film left on the surface of the glass blank after molding and a reaction product between the hydrocarbon film and the glass, by a subsequent process, e.g., an anneal process.

As compared with the carbon layer, the hydrocarbon layer contains much $CH_2$ in the layer with same thickness, therefore the transmissivity of the glass blank does not deteriorate so much. The advantage to prevent the fusion and cracking is sufficiently obtained even in the case of the hydrocarbon layer being ultrathin film (having a thickness of 10 to 50 Å).

A usable method for forming the hydrocarbon layer includes such methods by which the hydrocarbon layer can be formed uniformly on the glass blank as high frequency discharge processing of hydrocarbon gas, ion gun processing or DC discharge processing. Besides, those methods exhibit an advantage in which processing needs low costs.

As stated earlier, one of the objects of the present invention is to obtain the non-spherical lens. According to a still further aspect of the invention, there is provided a molding method comprising the steps of preparing a glass blank, and molding the glass blank obtained in the preparing step in to a final lens shape, whereby a non-spherical lens is obtainable.

According to yet another aspect of the invention, there is provided a glass blank for producing an optical element and employed as a molding material upon producing the optical element by press molding, comprising a mixture layer of carbon fluoride carbide and hydrocarbon coated on a surface on which at least optical functional surface of a glass substrate is formed.

A thickness of the ($CF_x+CH_x$) mixture layer of fluorine carbide and hydrocarbon is 10 to 50 Å. With this arrangement, an extremely small amount of reactive gas layer is formed on the interface between the mold member and the glass blank to thereby reduce the adhesion between the mold members and the glass blank. It is therefore possible to prevent the fusion and cracking. As compares with the carbon layer, the mixture layer of ($CF_x+CH_x$) contains much $CF_x$ or $CH_x$ in the layer with the same thickness. Hence, the transmissivity of the glass blank is not decreased so much. Besides, the advantage to prevent the fusion and cracking is sufficiently is obtained even in the case of the hydrocarbon layer being an ultrathin layer (having a thickness of 10 to 50 Å). Since an activity of fluorine to the glass is high, the adhesivity of the layer to be coated is enhanced.

For purposes of forming the mixture layer of ($CF_x+CH_x$), a low cost method such as high frequency discharge processing of a hydrocarbon gas, ion, gun processing or DC discharge processing can be used in which the hydrocarbon layer can be formed uniformly on the glass blank.

BRIEF DESCRIPTION OF THE DRAWINGS

Other objects and advantages of the present invention will become apparent during the following discussion taken in conjunction with the accompanying drawings, in which:

FIG. 4 is a sectional view depicting the glass blank;

FIG. 5 is a schematic diagram illustrating an outline of construction of the thin film deposition apparatus employed for producing the glass blank in the embodiment shown in FIG. 4;

FIG. 6 is a sectional view showing one example of the apparatus in which press molding is effected;

FIG. 7 is a sectional view depicting the glass blank;

FIG. 8 is an explanatory diagram showing an outline of construction of an apparatus for coating layers;

FIG. 9 is an explanatory diagram illustrating a molding apparatus;

DESCRIPTION OF THE PREFERRED EMBODIMENTS

A first embodiment of the present invention will hereinafter be described.

Figure 1:
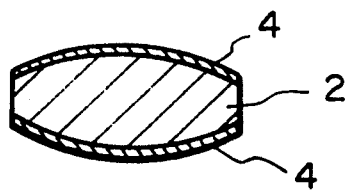
FIG. 1 is a sectional view showing first embodiment of a glass blank according to the present invention.

FIG. 1 is a sectional view showing first embodiment of a glass blank according to the present invention.

Given in this embodiment is an example where a double-convex lens is used as an optical element.

Referring to FIG. 1, the numeral 2 represents a glass substrate defined as a material for press molding. An optical glass having a dispersive power and a refractive index which are necessary for obtaining a lens exhibiting desired optical characteristics, is used as the glass substrate. The glass substrate 2 is finished with dimension and configuration which are approximate to the desired lens shape.

A hydrocarbon layer 4 is coated on the surfaces (upper and lower surfaces) on which optical functional surfaces of the glass substrate 2 are formed. A thickness of the hydrocarbon layer is, for instance, 10 to 50 Å, preferably 15 to 35 Å. If the hydrocarbon layer is too thin, the advantages are insufficient. Whereas if too thick, there increases a possibility of causing a film exfoliation. The hydrocarbon layer 4 can be formed by use of a thin film deposition technique such as plasma processing and ion gun processing. An atomic ratio of carbon/hydrogen in the hydrocarbon layer 4 is, e.g., 10/6 to 10/0.5, more preferably 10/5 to 10/1.

Figure 2:
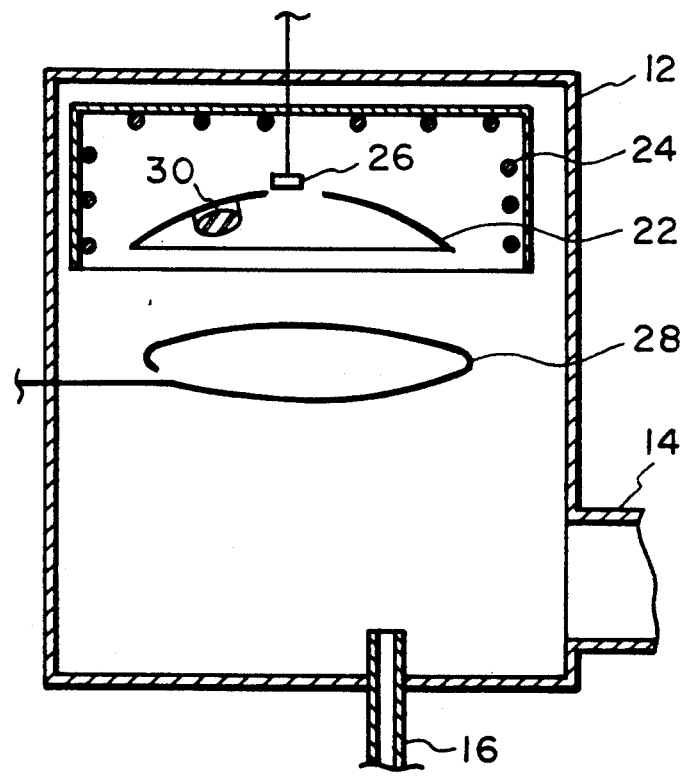
FIG. 2 is a schematic diagram illustrating an outline of construction of a thin film deposition apparatus employed for producing the glass blank in the first embodiment.

FIG. 2 is a schematic diagram depicting an outline of construction of a thin film deposition apparatus employed for producing a glass blank in the embodiment. The following is a description of an example for producing the blank in conjunction with FIG. 2.

Referring to FIG. 2, the numeral 12 denotes a vacuum vessel, 14 denotes a discharge port formed in the vacuum vessel and connected to a vacuum discharge source (not shown), and 16 denotes a gas introduction port, connected to a gas source (not shown), for introducing a gas into the vacuum vessel 12.

Accommodated in the upper part of the vacuum vessel 12 are a doom-like holder 22 for holding the glass substrate, a heater 24 for heating the glass substrate and a crystal film thickness monitor 26 for measuring a layer thickness. Numeral 28 denotes a high frequency application antenna. The numeral 30 stands for the glass substrate held by the holder 22.

Coating the hydrocarbon layer 4 on the surface of the glass substrate 30(2) involves the following processes. The gas is discharged from the discharge port 14, and an interior of the vacuum vessel 12 is thereby depressurized. Thereafter, a hydrocarbon gas is introduced from the gas introduction port 16 up to, e.g., $5 \times 10^{-2}$ to $5 \times 10^{-4}$ Torr. A high frequency of, e.g., 100 to 500 W is applied to the high frequency application antenna 28, thereby generating hydrocarbon plasma.

Exemplified as a hydrocarbon gas introduced into the vacuum vessel 12 are, e.g., methane, ethane, propane, ethylene, propylene and acetylene.

Since the atomic ratio of carbon/hydrogen in the hydrocarbon layer 4 varies depending on deposition conditions, the conditions are set to obtain a desired atomic ratio.

The following is an explanation of an actual example where the glass blank in the embodiment given above is produced by using the above-described apparatus.

Cleaned is the glass substrate 30 obtained by polishing and finishing a flint optical glass (SF8) into a predetermined shape. The glass substrate 30 is set in the holder 22. The substrate 30 is heated by the heater 24 up to 300° C. The gas is discharged from the discharge port 14 till a vacuum degree in the vacuum vessel 12 reaches $1 \times 10^{-5}$ Torr or under. Thereafter, an Ar gas is introduced from the gas introduction port 16 up to $5 \times 10^{-4}$ Torr. A high frequency of 300 W is applied to the high frequency application antenna 28, thereby effecting high frequency discharging. Plasma cleaning of the glass substrate 30 is thus effected. After this process, the introduction of the Ar gas is stopped. The vacuum degree is returned to $1 \times 10^{-5}$ Torr, and a CH$_4$ gas is introduced via a gas introduction port 16 up to $1 \times 10^{-3}$ Torr. A high frequency of 200 W is applied to the high frequency application antenna 28, thereby performing high frequency discharging, whereby the hydrocarbon layer 4 having a thickness of approximately 30 Å is formed on the glass substrate 30. An atomic ratio of carbon/hydrogen in the hydrocarbon layer 4 turns out to be approximately 10/2 as a result of measurement based on an infrared spectral analysis.

Figure 3:
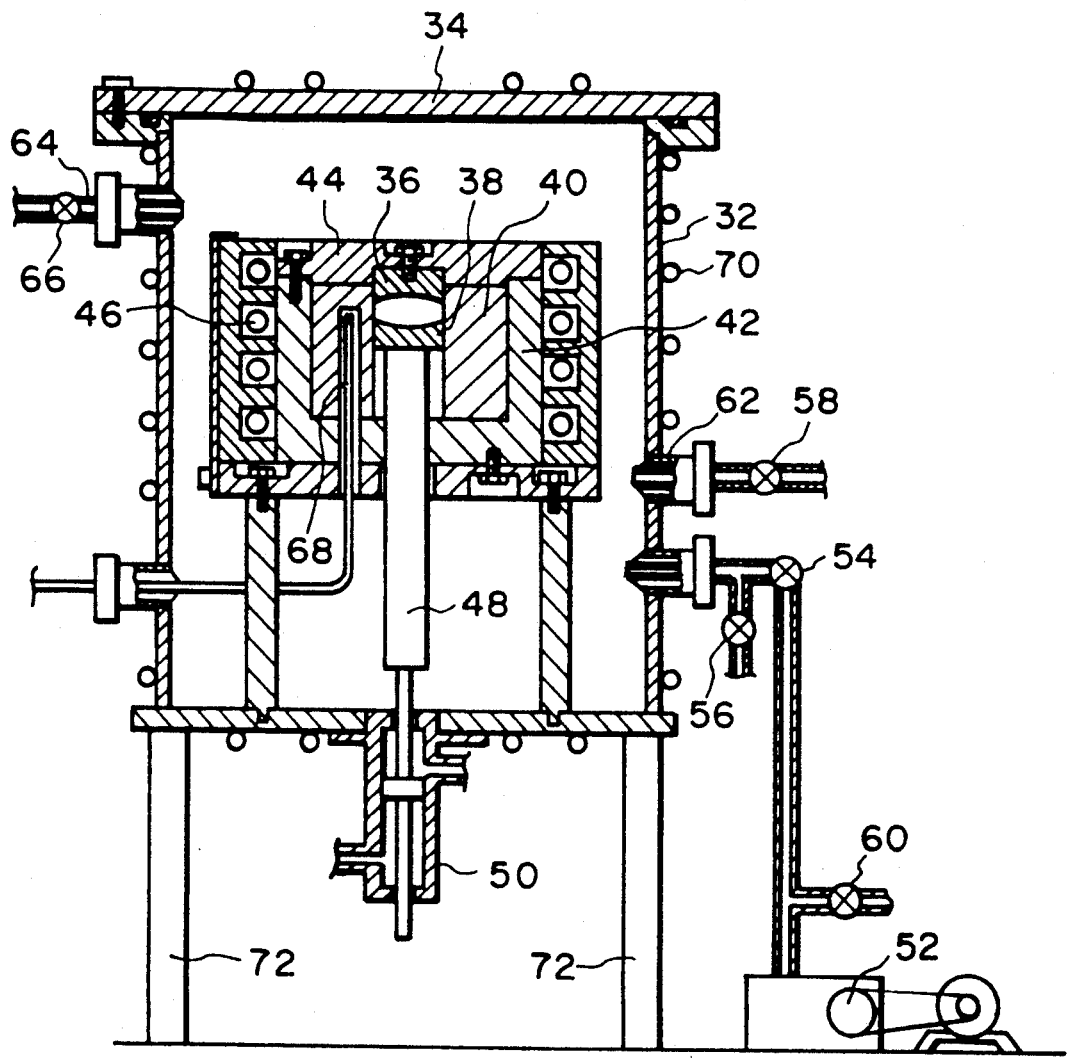
FIG. 3 is a sectional view showing one example of an apparatus in which press molding is effected.

FIG. 3 is a sectional view showing one example of the apparatus in which the press molding is carried out by use of the glass blank obtained in the manner discussed above.

Referring to FIG. 3, the numeral 32 represents a vacuum vessel body, and 34 is a cover thereof. The numerals 36, 38, 40 designate a top mold member, a bottom mold member and a drum mold member for pressmolding the lens, respectively. The numeral 42 denotes a tool holder, 44 denotes a top mold member holder, 46 denotes a heater, 48 denotes a thrust rod for thrusting up the bottom mold member, 50 denotes a cylinder for operating the thrust rod, 52 denotes an evacuation pump, 54, 56, 58, 60 denote valves, 62 denotes a pipe for introducing a non-oxidative gas such as a nitrogen gas, 64 denotes a leak pipe, 66 denotes a valve, 68 denotes a temperature sensor, 70 denotes a water cooling pipe, and 72 denotes a vacuum vessel support member.

The top mold member 36, the bottom mold member 38 and the drum mold member 40 may be constructed in such a manner that e.g., a super alloy, Si$_3$N$_4$, SiC, sialon, cermet, Al$_2$O$_3$, Z$_r$O$_2$ and Cr$_2$O$_3$ are used as a base material, if necessary, whose surface is coated with Si$_3$N$_4$, TiN, TaN, BN, AlN, SiC, TaC, WC and a platinum alloy.

Given next is an actual example where the press molding is performed by use of the glass blank in the embodiment described above in the thus constructed apparatus.

The top mold member 36 and the bottom mold member 38 used herein are made of Si$_3$N$_4$. The surfaces, formed as optical functional surfaces, of these mold members each have a surface accuracy of less than 3 in terms of Newton ring and a center line average surface roughness of less than 0.02 μm.

The glass blank is disposed in the molds. The vacuum vessel is evacuated up to $1 \times 10^{-2}$ Torr or under. Subsequently, the nitrogen gas is introduced into the vacuum vessel.

After the molds are heated up to 530° C., the glass blank is pressed for 5 minutes under a pressure of 100 kg/cm$^2$ by operating the cylinder 50. Thereafter, the molds is gradually cooled when reaching 200° C. or under.

The air is introduced into the vacuum vessel. The molds are opened to take out a molded product.

One hundred pieces of lenses are molded in the manner described above. On observing the functional surfaces of the obtained lens with a scanning type electron microscope having a magnification as high as 3750, no surface defect can be seen. Neither coloring nor fogging appear on the double surfaces. Besides, the molded product has no crack at all. Moreover, the two lens surfaces exhibit a good surface accuracy.

As discussed above, in accordance with this embodiment, the hydrocarbon layer is coated on the surfaces on which at least the optical functional surfaces of the glass substrate are formed, thereby preventing the fusion between the glass blank and the mold members. In addition, it is possible to prevent the occurrences of fogging, coloring and a decline of the surface accuracy of the molded product.

Figure 4:
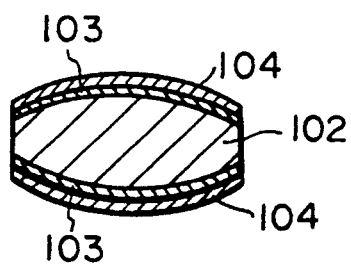
FIGS. 4 to 6 show second embodiment of the second object of the present invention.

FIG. 4 is a sectional view showing second embodiment of the glass blank of this invention. This embodiment gives an example where a double-convex lens is used as an optical element.

Referring to FIG. 4, the numeral 102 represents a glass substrate defined as a material for press molding. An optical glass having a dispersive power and a refractive index which are necessary for obtaining a lens exhibiting desired optical characteristics, is used as the glass substrate. The glass substrate 102 is finished with dimension and configuration which are approximate to the desired lens shape.

A reaction preventive layer 103 and a hydrocarbon layer 104 are coated in this sequence on the surfaces (upper and lower surfaces) on which optical functional surfaces of the glass substrate 2 are formed.

As the reaction preventive layer 103, for example, $Al_2O_3$, $SiO_2$, $NgF_2$ or a glass for deposition are usable. A thickness of the reaction preventive layer 103 is, e.g., 100 to 500 Å. The reaction preventive layer 103 can be formed by a thin film deposition technique such as vacuum deposition and the like.

A thickness of the hydrocarbon layer 104 is, for instance 10 to 50 Å, preferably 15 to 35 Å. If the hydrocarbon layer is too thin, the advantages are insufficient. Whereas if too thick, there is caused a remarkable decline in transmissivity of the molded product, so that an anneal process is required. The hydrocarbon layer 104 can be formed by use of a simple thin film deposition technique such as plasma processing and ion gun processing. An atomic ratio of carbon/hydrogen in the hydrocarbon layer 104 is, e.g., 10/6 to 10/0.5, more preferably 10/5 to 10/1.

Figure 5:
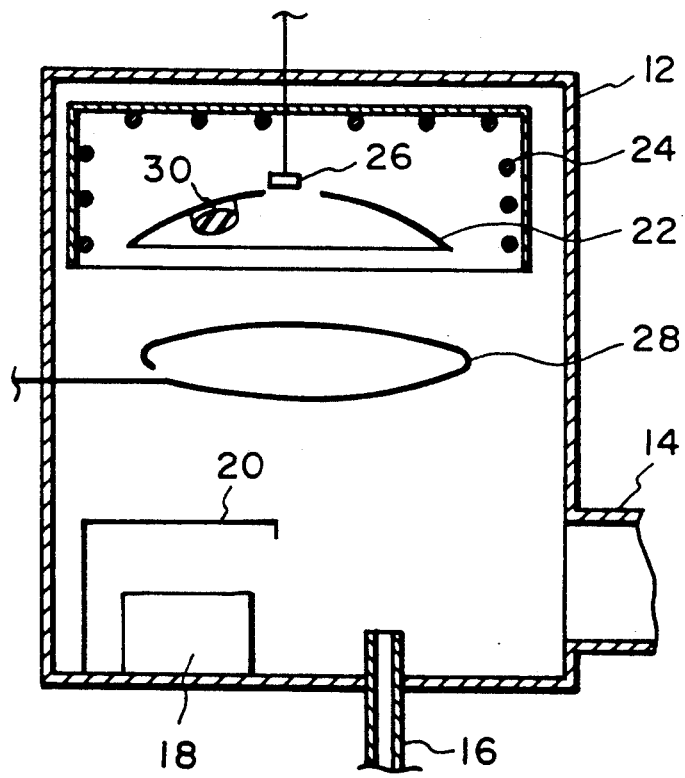

FIG. 5 is a schematic diagram depicting an outline of construction of a thin film deposition apparatus employed for producing a glass blank in this embodiment. The following is a description of an example of producing the blank in conjunction with FIG. 5.

In FIG. 5, the same numerals as those in the apparatus of FIG. 2 indicate the members having the identical functions. The numeral 12 denotes a vacuum vessel, 14 denotes a discharge port formed in the vacuum vessel 12 and connected to vacuum discharge source (not shown), and 16 denotes a gas introduction port, connected to gas source (not shown), for introducing a gas into the vacuum vessel 12.

Accommodated in the lower part of the vacuum vessel 12 are an evaporation source 18 and a shutter 20. Accommodated in the upper part of the vacuum vessel 12 are a doom-like holder 22 for holding the glass substrate, a heater 24 for heating the glass substrate and a crystal film thickness monitor 26 for measuring a layer thickness. Numeral 28 is a high frequency application antenna. The numeral 30 stands for the glass substrate hold by the holder 22.

Sequential forming of the reaction preventive layer 103 and the hydrocarbon layer 104 on the surface of the glass substrate 30(102) involves the following processes.

The gas is discharged from the discharge port 14, and an interior of the vacuum vessel 12 is thereby depressurized. Thereafter, a reaction preventive layer forming material is evaporated from the evaporation source 18. Subsequently, a hydrocarbon gas is introduced from the gas introduction port 16 up to, e.g., $5 \times 10^{-2}$ to $5 \times 10^{-4}$ Torr. A high frequency of, e.g., 100 to 500 W is applied to the high frequency application antenna 28, thereby generating hydrocarbon plasma.

Exemplified as a hydrocarbon gas introduced into the vacuum vessel 12 are, e.g., methane, ethane, propane, ethylene, propylene and acetylene.

Since the atomic ratio of carbon/hydrogen in the hydrocarbon layer 104 varies depending on deposition conditions, the conditions are set to obtain a desired atomic ratio.

The following is an explanation of an actual example where the glass blank in this embodiment given above is produced by using the above-described apparatus.

Cleaned is the glass substrate 30 obtained by polishing and finishing a flint optical glass (SF8) into a predetermined shape. The glass substrate 30 is set in the holder 22. The substrate 30 is heated by the heater 24 up to 300° C. The gas is discharged from the discharge port 14 till a vacuum degree in the vacuum vessel 12 reaches $1 \times 10^{-3}$ Torr or under. Thereafter, an Ar gas is introduced from the gas introduction port 16 up to $5 \times 10^{-4}$ Torr A high frequency of 300 W is applied to the high frequency application antenna 28, thereby effecting high frequency discharging. Plasma cleaning of the glass substrate 30 is thus effected. After this process, the introduction of the Ar gas is stopped. The vacuum degree is returned to $1 \times 10^{-5}$ Torr, and a glass for deposition is evaporated from the evaporation source 18, whereby the reaction preventive layer (deposition glass layer) 103 having a thickness of approximately 30 Å is formed on the glass substrate 30. Next, the evaporation from the evaporation source 18 is stopped, and a $CH_4$ gas is introduced via a gas introduction port 16 up to $1 \times 10^{-3}$ Torr. A high frequency of 400 W is applied to the high frequency application antenna 28 to perform high frequency discharging, whereby the hydrocarbon layer 104 having a thickness of approximately 30 Å is then formed. The atomic ratio of carbon/hydrogen in the hydrocarbon layer 104 turns out to be approximately 10/2 as a result of measurement based on an infrared spectral analysis.

Figure 6:
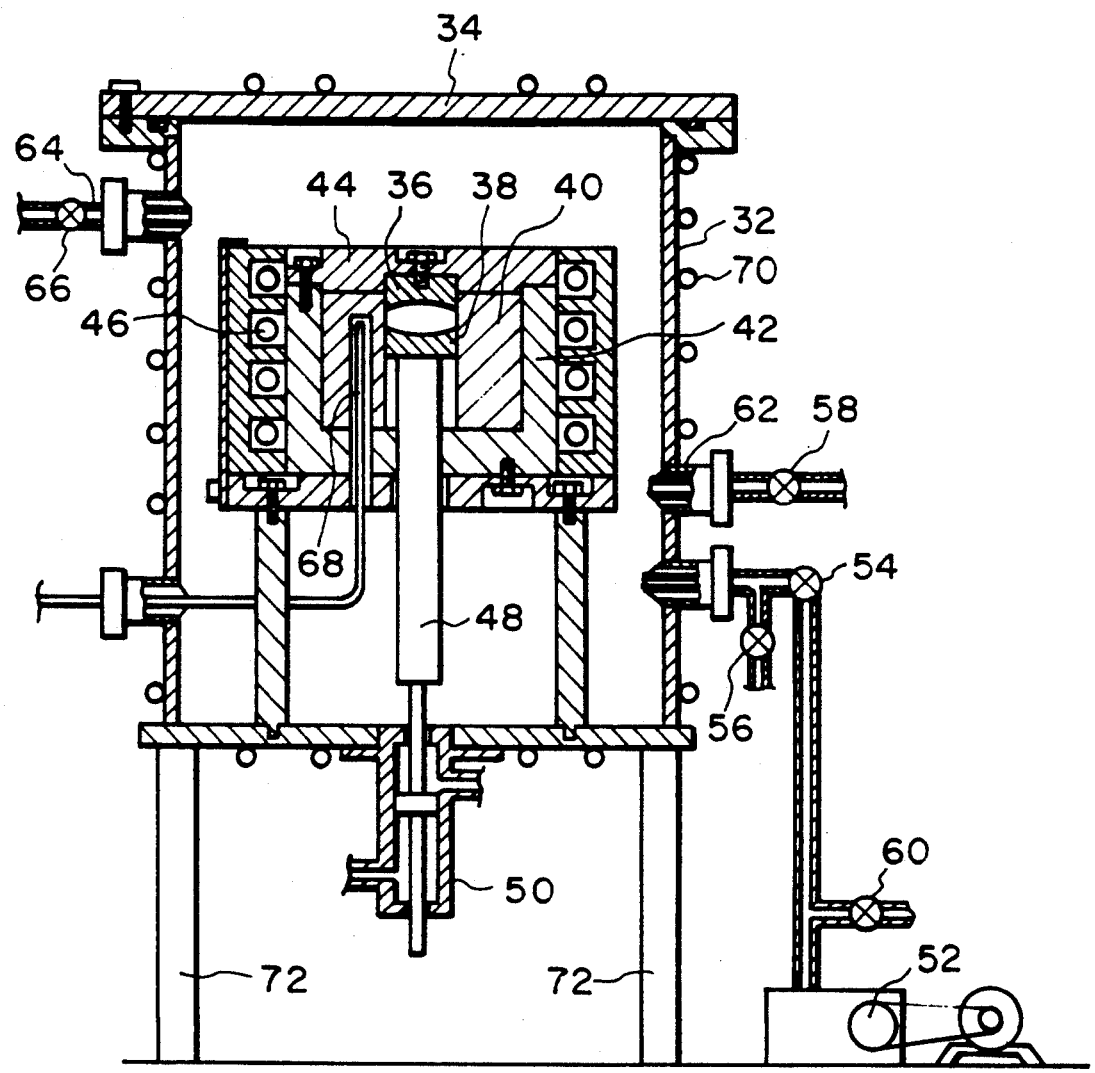

FIG. 6 is a sectional view showing one example of the apparatus in which the press molding is carried out by use of the glass blank obtained in the manner discussed above. The apparatus shown in FIG. 6 has the same arrangement as that shown in FIG. 2.

Referring to FIG. 6, the numeral 32 represents a vacuum vessel body; and 34 a cover thereof. The numerals 36, 38, 40 designate a top mold member, a bottom mold member and a drum mold member for press-molding the lens, respectively. The numeral 42 denotes a mold holder; 44 a top mold member holder; 46 a heater; 48 a thrust rod for thrusting up the bottom mold member; 50 a cylinder for operating the thrust rod; 52 an evacuation pump; 54, 56, 58, 60 valves; 62 a pipe for introducing a non-oxidative gas such as a nitrogen gas; 64 a leak pipe; 66 a valve; 68 a temperature sensor; 70 a water cooling pipe; and 72 a vacuum vessel support member.

The top mold member 36, the bottom mold member 38 and the drum mold member 40 may be constructed in such a manner that e.g., a super alloy, $Si_3N_4$, SiC, sialon, cermet $Al_2O_3$, $ZrO_2$ and $Cr_2O_3$ are used as a base metal, if necessary, whose surface is coated with $Si_3N_4$, TiN, TaN, BN, AlN, SiC, TaC, WC and a platinum alloy.

Given next is an actual example where the press molding is performed by use of the glass blank in the embodiment described above in the thus constructed apparatus.

The top mold member 36 and the bottom mold member 38 used herein are made of $Si_3N_4$. The surface, formed as optical functional surface, of these mold members each have a surface accuracy of less than 3 in terms of Newton ring and a center line average surface roughness of less than 0.02 μm.

The glass blank is disposed in the molds. The vacuum vessel is evacuated up to $1 \times 10^{-2}$ Torr or under. Subsequently, the nitrogen gas is introduced into the vacuum vessel.

After the molds are heated up to 530° C., the glass blank is pressed for 5 minutes under a pressure of 100 kg/cm² by operating the cylinder 50. Thereafter, the molds is gradually cooled when reaching 200° C. or under.

The air is introduced into the vacuum vessel. The molds are opened to take out a molded product.

One hundred pieces of lenses are molded in the manner described above. On observing the functional surfaces of the obtained lens with a scanning type electron microscope having a magnification as high as 3750, no surface defect can be seen. Neither coloring nor fogging appear on the double surfaces. No fusion to the tool members is caused at all. Besides, the molded product has no crack at all. Moreover, the two lens surfaces exhibit a good surface accuracy.

As discussed above, in accordance with this embodiment, the reaction preventive layer and hydrocarbon layer are coated in this sequence on the surfaces on which at least the optical functional surfaces of the glass substrate are formed, thereby preventing the fusion between the glass blank and the mold members. In addition, it is possible to prevent the occurrences of fogging, coloring and a decline of the surface accuracy of the molded product.

A third embodiment of the present invention will hereinafter be described with reference to the drawings.

Figure 7:
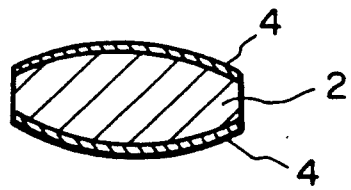
FIGS. 7 to 9 show third embodiment of the present invention.

FIG. 7 shows third embodiment of a glass blank according to the present invention. Give in this embodiment is an example where a double-convex lens is used as an optical element.

Referring to FIG. 7, the numeral 2 represents a glass substrate defined as a material for press molding. An optical glass having a dispersive power and a refractive index which are necessary for obtaining a lens exhibiting desired optical characteristics, is used as the glass substrate. The glass substrate 2 is finished with dimension and configuration which are approximate to the desired lens shape.

A mixture layer 4 of $(CF_x + CH_x)$ is coated on the surfaces (upper and lower surfaces) on which optical functional surfaces of the glass substrate 2 are formed. A thickness of the mixture layer 4 of $(CF_x + CH_x)$ is, for instance, 10 to 50 Å, preferably 15 to 35 Å. If the mixture layer of $(CF_x + CH_x)$ is too thin, the advantage to reduce an adhesion between the molds and the glass is insufficient. Whereas if too thick, there increases a possibility of causing a decline of surface transferability, coloring and fogging of the molded product. The mixture layer 4 can be formed into an ultrathin film by use of a thin film deposition technique such as plasma processing and ion gun processing.

Figure 8:
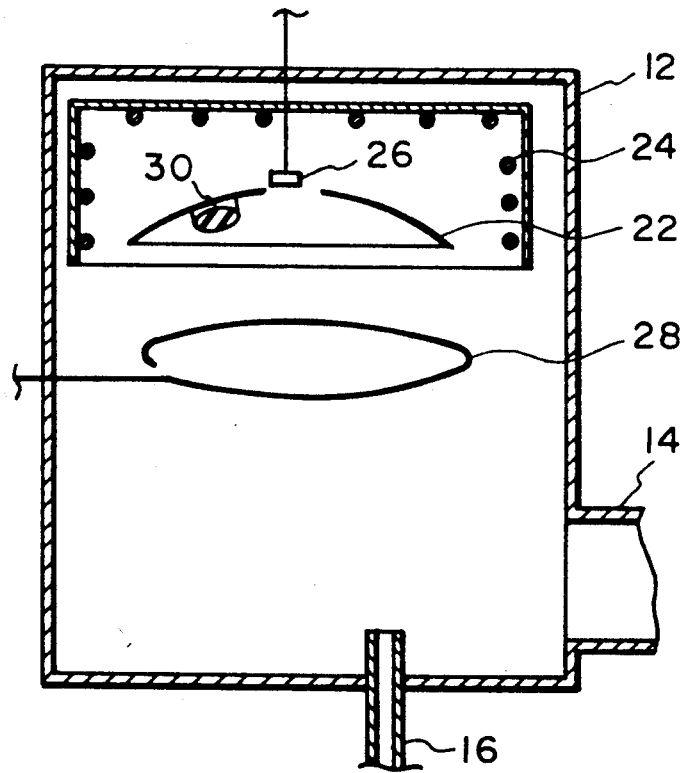

FIG. 8 is a schematic diagram depicting an outline of construction of a thin film deposition apparatus employed for producing a glass blank in this embodiment, this apparatus being the same is that shown in FIG. 2. The following is a description of an example of producing the blank in conjunction with FIG. 8. Referring to FIG. 8, the numeral 12 denotes a vacuum vessel; 14 a discharge port formed in the vacuum vessel and connected to vacuum discharge source (not shown), and 16 a gas introduction port, connected to gas source (not shown), for introducing a gas into the vacuum vessel 12.

Accommodated in the upper part of the vacuum vessel 12 are a doom-like holder 22 for holding the glass substrate, a heater 24 for heating the glass substrate and a crystal film thickness monitor 26 for measuring a layer thickness. Numeral 28 is a high frequency application antenna. The numeral 30 stands for the glass substrate held by the holder 22.

Coating the mixture layer 4 of $(CF_x + CH_x)$ on the surface of the glass substrate 30(2) involves the following processes. The gas is discharged from the discharge port 14, and an interior of the vacuum vessel 12 is thereby depressurized. Thereafter, a mixture gas of $(CF_x + CH_x)$ is introduced from the gas introduction port 16 up to, e.g., $5 \times 10^{-2}$ to $5 \times 10^{-4}$ Torr. A high frequency of, e.g., 100 to 500 W is applied to the high frequency application antenna 28 thereby generating $(CF_x + CH_x)$ plasma.

Exemplified as a hydrocarbon gas in the mixture gas of $(CF_x + CH_x)$ introduced into the vacuum vessel 12 is, e.g., methane, ethane, propane, ethylene, propylene and acetylene. Since the atomic ratio of carbon/fluorine or carbon/hydrogen in the mixture layer 4 of $(CF_x + CH_x)$ varies depending on deposition conditions, the conditions are set to obtain a desired atomic ratio.

The following is an explanation of an actual example where the glass blank in the embodiment given above is produced by using the above-described apparatus.

Cleaned is the glass substrate 30 obtained by polishing and finishing a crown glass (SK12) into a predetermined shape. The glass substrate 30 is set in the holder 22. The substrate 30 is heated by the heater 24 up to 300° C. The gas is discharged from the discharge port 14 till a vacuum degree in the vacuum vessel 12 reaches $1 \times 10^{-5}$ Torr or under. Thereafter, an Ar gas is introduced from the gas introduction port 16 up to $5 \times 10^{-4}$ Torr. A high frequency of 300 W is applied to the high frequency application antenna 28, thereby effecting high frequency discharging. Plasma cleaning of the glass substrate 30 is thus effected. After this process, the introduction of the Ar gas is stopped. The vacuum degree is returned to $1 \times 10^{-5}$ Torr, and a mixture gas of $(CH_4 + CF_4)$ is introduced via a gas introduction port 16 up to $1 \times 10^{-3}$ Torr. A high frequency of 200 W is applied to the high frequency application antenna 28 to perform high frequency discharging, whereby the mixture layer 4 of $CF_x + CH_x$ having a thickness of approximately 30 Å is formed on the glass substrate).

Figure 9:
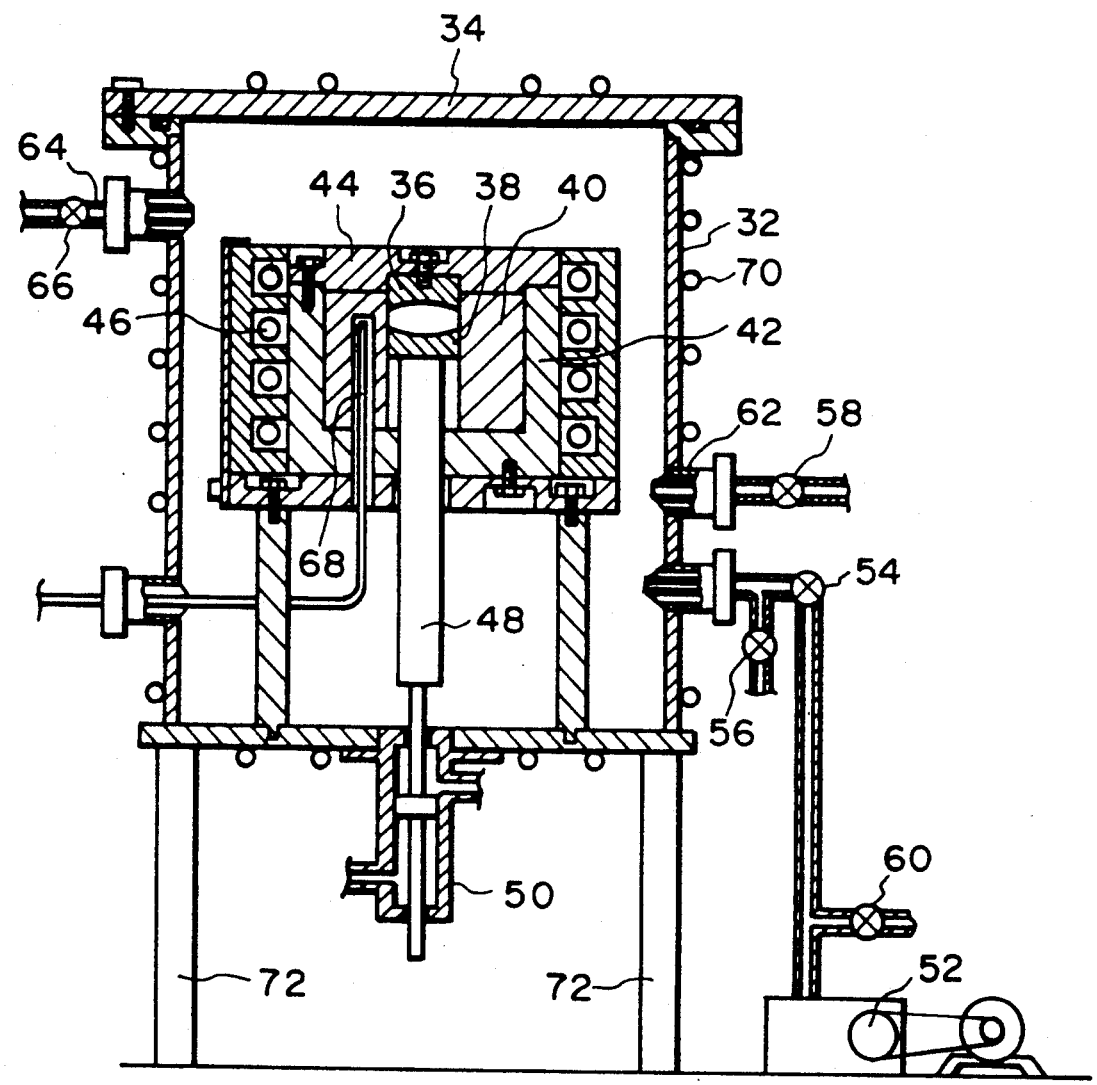

FIG. 9 is a sectional view showing one example of the apparatus in which the press molding is carried out by use of the glass blank obtained in the manner discussed above. Referring to FIG. 9, the numeral 32 represents a vacuum vessel body; and 34 a cover thereof. The numerals 36, 38, 40 designate a top mold member, a bottom mold member and a drum mold member for press-molding the lens, respectively. The numeral 42 denotes a mold holder; 44 a top mold member holder; 46 a heater; 48 a thrust rod for thrusting up the bottom tool member; 50 a cylinder for operating the thrust rod; 52 an evacuation pump; 54, 58, 58, 60 valves; 62 a pipe for introducing a non-oxidative gas such as a nitrogen gas; 64 a leak pipe; 66 a valve; 68 a temperature sensor; 70 a water cooling pipe; and 72 a vacuum vessel support member.

The top mold member 36, the bottom mold member 38 and the drum mold member 40 may be constructed in such a manner that e.g., a super alloy, $Si_3N_4$, SiC, sialon, cermet, $Al_2O_3$, $ZrO_2$ and $Cr_2O_3$ are used as a base metal, if necessary, whose surface is coated with $Si_3N_4$, TiN, TaN, BN, AlN, SiC, TaC, WC and a platinum alloy.

Given next is an actual example where the press molding is performed by use of the glass blank in the embodiment described above in the thus constructed apparatus. The top mold member 36 and the bottom mold member 38 used herein are made of $Si_3N_4$. The surfaces, formed as optical functional surfaces, of these mold members each have a surface accuracy of less than 3 in term of Newton ring and a center line average surface roughness of less than 0.02 $\mu$m. The glass blank is disposed in the molds. The vacuum vessel is evacuated up to $1 \times 10^{-2}$ Torr or under. Subsequently, the nitrogen gas is introduced into the vacuum vessel.

After the glass blank is heated up to 610° C., the glass blank is pressed for 5 minutes under a pressure of 100 kg/cm$^2$ by operating the cylinder 50. Thereafter, the molds is gradually cooled when reaching 200° C. or under. The air is introduced into the vacuum vessel. The molds are opened to take out a molded product.

One hundred pieces of lenses are molded in the manner described above. Subsequently, on observing the functional surfaces of the obtained lens with a scanning type electron microscope having a magnification as high as 3750, no surface defect can be seen. Neither coloring nor fogging appear on the double surfaces. Besides, the molded product has no crack at all. Moreover, the two lens surfaces exhibit a good surface accuracy.

As discussed above, in accordance with this embodiment, the mixture layer of $(CF_x + CH_x)$ is coated on the surfaces on which at least the optical functional surfaces of the glass substrate are formed, thereby preventing the fusion between the glass blank and the mold members. In addition, there is less deposit to the surface of the molds and it is possible to prevent the occurrences of fogging, coloring and a decline of the surface accuracy of the molded product.

A fourth embodiment will be described with reference to FIGS. 10 and 11 in combination with FIGS. 5 and 6.

A material of the glass substrate used in this invention has no particular restriction on condition that the glass is available typically for a material of press molding. Exemplified are flint glasses (SF, F), crown glasses (SK, BK), lanthanum flint glasses (LaSF, LaF) and lanthanum crown glass (LaK). The glass substrate is desirably finished by the grinding and polishing processes in a shape approximate to a predetermined configuration desired as an optical element after the forming process.

After effecting the above-described machining processes, the surface of the glass surface is formed with a layer in which an alkaline component is reduced (hereinafter referred to as a dealkalized layer).

Disclosed in Japanese Patent Laid-Open Application No. 62-207728 is an advantage of the dealkalized layer, the advantage being to prevent an evaporation of the alkaline component during molding of the glass blank, contaminations on the molds and the molded product and further occurrence of fusion between the molds and the molded products. The dealkalized layer is, however, required in this invention for providing the following advantages. That is, the dealkalized layer existing within the glass does not exhibit the effects to prevent the fusion between the molds and the molded product and cracks in the molded product. Hence, separately from the dealkalized layer, there is needed a layer (hydrocarbon layer in this invention) for reducing the adhesion between the molds and the molded product. This hydrocarbon layer is desirably as thin as possible in terms of the mold contaminations, coloring on the molded product and the surface transferability. Thinning of the film is attainable in combination with this dealkalized layer according to the present invention.

A thickness of the dealkalized layer is preferably 100 to 1000 Å. If thinner than 100 Å, the molded product reacts with the hydrocarbon layer during molding, resulting in coloring on the molded product. This in turn causes the mold contaminations, a lens cracking and also the adhesion between the molds and the molded product. Whereas if thicker than 1000 Å, cracks are caused on the surface of the molded product.

The dealkalized layer is formed in the following manner. The glass blank is set in a cleaning jig. The glass blank surface is cleaned by ultrasonic cleaning. Thereafter, the glass blank is continuously immersed in an acid dipping vessel. A preferable temperature of this acid is 26° to 28° C. for keeping a dealkalized layer thickness uniform. The acid capable of dissolving a modified oxide existing in the glass component may suffice. The available acids are, for instance, nitric acid, hydrochloric acid and acetic acid. In order to eliminate the acid adhered to the glass blank after the acid dipping process, the water washing is repeated. After being substituted by alcohol, a drying process is effected in a solvent vapor vessel. In the next process the hydrocarbon layer is formed.

The hydrocarbon layer causes an extremely small quantity of reactive glass layer to be formed on an interface between the mold members and the glass blank, thereby to reduce the adhesion between the mold members and the glass blank and to prevent the fusion and the cracking. For this purpose, in general a thickness of the hydrocarbon is preferably 5 to 50 Å, and more preferably 5 to 20 Å. If the hydrocarbon layer is too thin, the sufficient advantage to reduce the adhesion is not obtained. Whereas if too thick, coloring becomes conspicuous on the molded product. This causes not only a decrease in transmissivity but also a decline of the surface transferability. Hence, if the thickness is made too thick, there arises a necessity for eliminating both the hydrocarbon layer component left on the glass blank surface and the reaction product of the hydrocarbon layer component and the glass by a subsequent process, e.g., an anneal process after molding.

The hydrocarbon layer contains much $CH_2$ in the film in the case of the same film thickness as compared with a carbon layer. Therefore, the transmissivity of the glass blank is not so decreased. Besides, the advantages to prevent the fusion and the cracking suffice even in the case of an ultrathin film layer (having a thickness of 5 to 50 Å).

The usable method for forming the hydrocarbon layer includes such methods by which the hydrocarbon layer can be formed uniformly on the glass blank as high frequency discharge processing of the hydrocarbon gas, ion gun processing or DC discharge processing. These methods exhibit an advantage in which processing needs low costs.

An embodiment will hereinafter be explained specifically with reference to the drawings.

Figure 10:
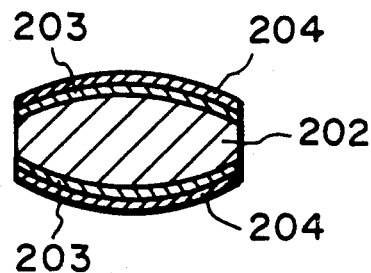
FIG. 10 is a sectional view showing fourth embodiment of the glass blank according to the present invention.
Figure 11:
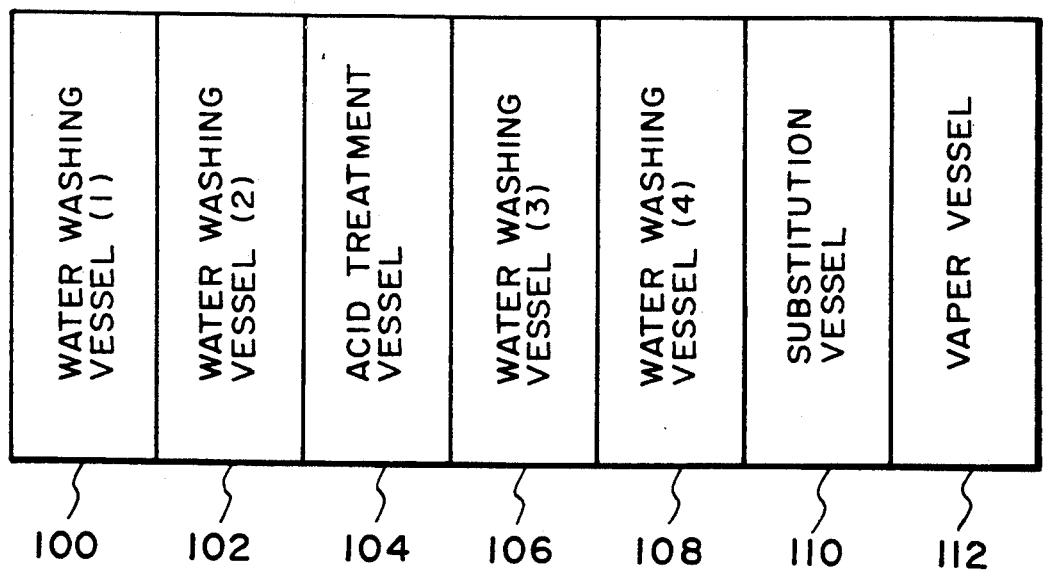
FIG. 11 is a diagram showing steps of processing a glass substrate in fourth embodiment.

FIG. 10 is a sectional view showing one embodiment of a glass blank according to the present invention. Given in this embodiment is an example where a double-convex lens is used as an optical element.

Referring to FIG. 10, the numeral 202 represents a glass substrate defined as a material for press molding. An optical glass having a dispersive power and a refractive index which are necessary for obtaining a lens exhibiting desired optical characteristics, is used as the glass substrate. The glass substrate 202 is finished with dimension and configuration which are approximate to the desired lens shape. A dealkalized layer 203 and a hydrocarbon layer 204 are coated in this sequence on the surfaces (upper and lower surfaces) on which optical functional surfaces of the glass substrate 202 are formed.

A layer which is formed by processing with, e.g., 3N, $HNO_3$ is usable as the dealkalized layer 203. A thickness of the dealkalized layer 203 is preferably 100 to 1000 Å.

A thickness of the hydrocarbon is preferably 5 to 50 Å, and more preferably 5 to 20 Å. If the hydrocarbon layer is too thin, the advantage to reduce the adhesion between the molds and the glass blank is not sufficient. Whereas if too thick, a drop in the transmissivity of the molded product becomes remarkable, so that the anneal process is required. The hydrocarbon layer 204 can be formed by use of a simple thin film deposition technique such as plasma processing and ion gun processing. An atomic ration of carbon/hydrogen in the hydrocarbon layer 204 is, e.g., 10/6 to 10/0.5, and more preferably 10/5 to 10/1.

The thin film deposition apparatus used for producing the glass blank in the embodiment described above is the same as that shown in FIG. 5, and the description is therefore omitted herein.

The following is an explanation of an actual example where the glass blank in the embodiment given above is manufactured by using said apparatus.

Set in an acid processing jig is the glass substrate 30 obtained by polishing and finishing a crown optical glass (SK12) in a predetermined shape. As illustrated in FIG. 11, the glass substrate is cleaned in a water washing vessels (1)100 and (2)102, thereafter, is processed in a 3N, $HNO_3$ acid processing vessel 104 for 3 minutes to form a processed layer having a thickness of approximately 400 Å. After this processing, the glass substrate is cleaned in water washing vessels (3)106 and (4)108. Subsequently, the water is substituted in an alcohol substitution vessel 110. The glass substrate is pulled up and dried in a triethane vapor vessel 112. Thereafter, this glass substrate 30 is set in a holder 22 in the vacuum vessel 12 of the apparatus. The substrate 30 is heated by the heater 24 up to 300° C. The gas is discharged from the discharge port 14 till a vacuum degree in the vacuum vessel 12 reaches $1 \times 10^{-5}$ Torr or under. Thereafter, an Ar gas is introduced from the gas introduction port 16 up to $5 \times 10^{-4}$ Torr A high frequency of 300 W is applied to the high frequency application antenna 28, thereby effecting high frequency discharging. Plasma cleaning of the glass substrate 30 is thus effected. After this process, a $CH_4$ gas is introduced via a gas introduction port 16 up to $1 \times 10^{-3}$ Torr. A high frequency of 400 W is applied to the high frequency application antenna 28, thereby performing high frequency discharging. The hydrocarbon layer 4 having a thickness of approximately 30 Å is then formed. The atomic ratio of carbon/hydrogen in the hydrocarbon layer 4 turns out to be approximately 10/2 as a result of measurement based on an infrared spectral analysis.

The apparatus for effecting press molding by use of the glass blank obtained in the manner discussed above is the same as that shown in FIG. 6.

The top mold member 36, the bottom mold member 38 and the drum mold member 40 may be constructed in such a manner that e.g., a super alloy, $Si_3N_4$, SiC, sialon, cermet $Al_2O_3$, $ZrO_2$ and $Cr_2O_3$ are used as a base material, if necessary, whose surface is coated with $Si_3N_4$, TiN, TaN, BN, AlN, SiC, TaC, WC and a platinum alloy.

Given next is an actual example where the press molding is performed by use of the glass blank in the embodiment described above by means of the apparatus (illustrated in FIG. 6).

The top mold member 36 and the bottom mold member 38 used herein are made of $Si_3N_4$. The surfaces, formed as optical functional surfaces, of these mold members each have a surface accuracy of less than 3 in terms of Newton ring and center line average surface roughness of less than 0.02 μm. The glass blank is disposed in the molds. The vacuum vessel is evacuated up to $1 \times 10^{-2}$ Torr or under. Subsequently, the nitrogen gas is introduced into the vacuum vessel. After the molds are heated up to 530° C., the glass blank is pressed for 5 minutes under a pressure of 100 kg/cm² by operating the cylinder 50. Thereafter, the molds are gradually cooled when reaching 200° C. or under. The air is introduced into the vacuum vessel. The molds are opened to take out a molded product.

One hundred pieces of lenses are molded in the manner described above. On observing the functional surfaces of the obtained lens with a scanning type electron microscope having a magnification as high as 5000, no surface defect can be seen. Neither coloring nor fogging appear on the double surfaces. Besides, the molded product has no crack at all. Moreover, the two lens surfaces exhibit a good surface accuracy.

As discussed above, in accordance with this embodiment, the dealkalized layer is formed on the surface of the glass substrate, and the hydrocarbon layer is further formed thereon, thereby preventing coloring of the molded product and fogging thereof caused by the hydrocarbon layer component. Besides, it is feasible to prevent the fusion and cracking by reducing the adhesion as well as hindering the reaction of the molded product to the mold members.

Although the embodiments of the present invention have been described in detail with reference to the accompanying drawings, it is to be understood that the present invention is not limited to those embodiments. Various changes or modifications may be effected therein by skilled in the art without departing from the scope or spirit of the invention.

We claim:

1. A non-spherical lens molded by a method comprising the steps of:
    (a) preparing a glass blank, said preparing step including substeps of preparing a spherical or disclike glass blank, and providing a hydrocarbon layer on a surface of said glass blank; and (b) molding said glass blank prepared in said preparing step into a lens shape, said molding step including substeps of heating said glass blank, and pressing said glass blank, by forming said glass blank coated with said hydrocarbon into a configuration approximate to a final lens shape, and further providing a non-spherical portion on at least a part of a surface of said lens molded in said pressing substep;

wherein said glass blank is molded into a predetermined lens shape by said pressing substep after said glass blank coated with said hydrocarbon layer is heated by said heating substep up to a molding temperature.

2. A non-spherical lens produced by a method comprising the steps of:
- (a) preparing a glass lank, said preparing step including substeps of preparing said glass blank by forming a glass material into a preparatory shape, and coating a reaction preventive film and a hydrocarbon film on a surface of said glass blank; and
- (b) molding said glass blank prepared in said preparing step into a lens shape, said molding step including substeps of heating said glass blank and pressing said glass blank;

wherein said glass blank is molded from said preparatory shape to a final lens shape by said pressing substep after said glass blank coated with said reaction preventive film and said hydrocarbon film is heated up to a molding temperature.

* * * * *

UNITED STATES PATENT AND TRADEMARK OFFICE
CERTIFICATE OF CORRECTION

PATENT NO. : 5,168,404
DATED : December 1, 1992
INVENTOR(S) : MIYAZAKI, ET AL.

It is certified that error appears in the above-identified patent and that said Letters Patent is hereby corrected as shown below:

COLUMN 2:

Line 12, "glank" should read --blank--.
    Line 16, "product" should read --product and--.
    Line 63, "crucking" should read --cracking--.

COLUMN 4:

Line 16, "is" should be deleted.

COLUMN 6:

Line 59, "is" should read --are--.

COLUMN 7:

Line 60, "doom-like holder 22" should read --dome-like holder 22--.
    Line 64, "hold" should read --held--.

COLUMN 8:

Line 28, "Torr" should read --Torr.--

COLUMN 9:

Line 21, "is" should read --are--.
    Line 46, "Give" should read --Given--.

UNITED STATES PATENT AND TRADEMARK OFFICE
CERTIFICATE OF CORRECTION

PATENT NO. : 5,168,404
DATED : December 1, 1991
INVENTOR(S) : MIYAZAKI, ET AL.

It is certified that error appears in the above-identified patent and that said Letters Patent is hereby corrected as shown below:

COLUMN 10:

Line 6, "is should read --as--.
Line 59, "CFx + CHxhaving" should read
--CFx + CHx having--.

COLUMN 11:

Line 4, "54, 58, 58, 60" should read --54, 56, 58, 60--.
Line 30, "is" should read --are--.

COLUMN 13:

Line 49, "a" should be deleted.
Line 64, "Torr" should read --Torr.--

COLUMN 16:

Line 3, "lank, " should read --blank,--.

Signed and Sealed this

Seventh Day of December, 1993

Attest:

BRUCE LEHMAN

Attesting Officer        Commissioner of Patents and Trademarks